Dec. 8, 1970  H. A. DOWNEY  3,545,231
MULTIPLE FLEXIBLE ELEMENT COUPLING
Filed Feb. 7, 1969  2 Sheets-Sheet 1
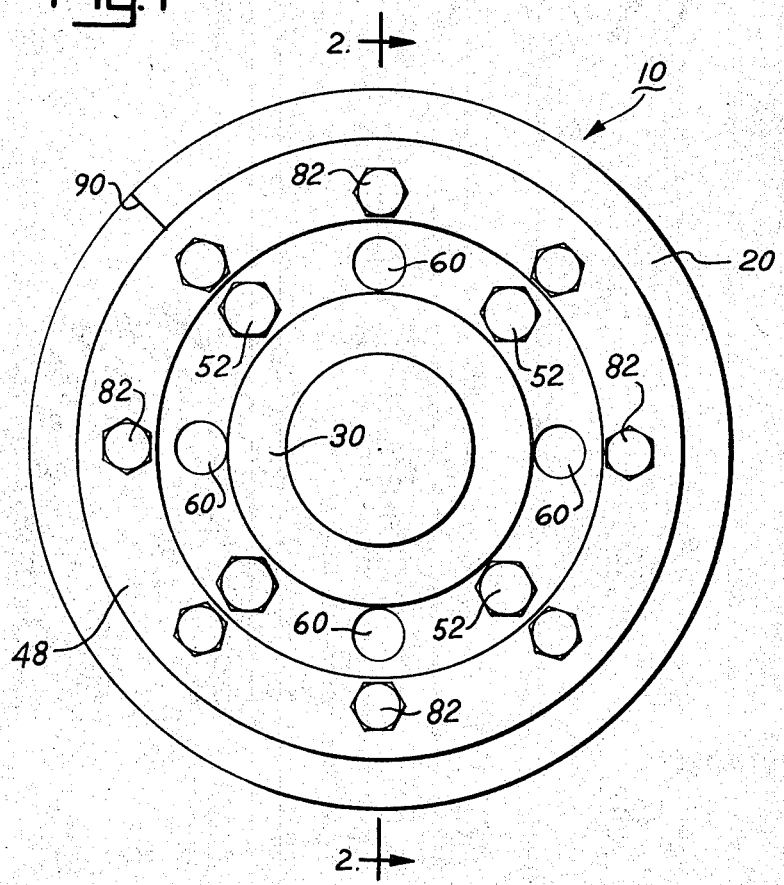
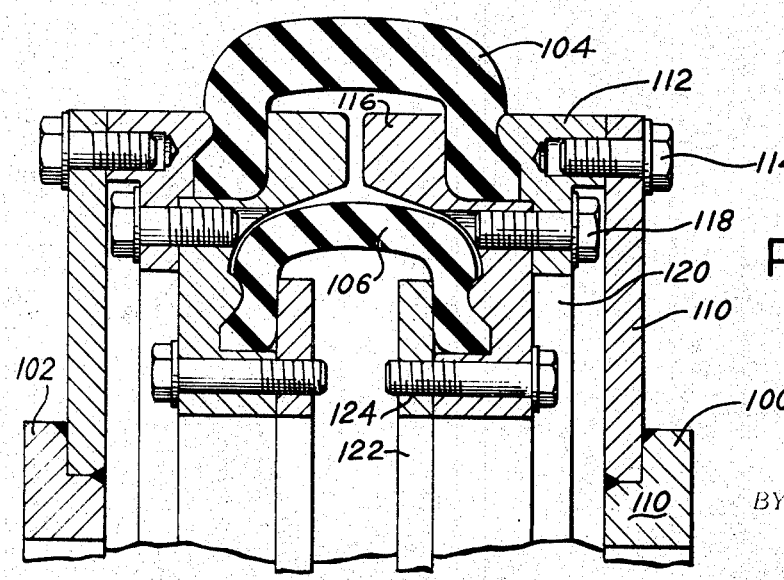
INVENTOR.
HOLMES A. DOWNEY
BY
M. A. Hobbs
ATTORNEY

United States Patent Office 3,545,231
Patented Dec. 8, 1970

---

3,545,231
MULTIPLE FLEXIBLE ELEMENT COUPLING
Holmes A. Downey, South Bend, Ind., assignor to Reliance Electric Company, Cleveland, Ohio, a corporation of Delaware
Filed Feb. 7, 1969, Ser. No. 797,387
Int. Cl. F16d 3/68
U.S. Cl. 64—11
12 Claims

ABSTRACT OF THE DISCLOSURE

A multiple flexible element coupling for connecting two rotating shafts in end-to-end relation, in which two flanges are mounted on the ends of the two shafts and are connected by two torsional elements in parallel relation. The two elements are clamped to the flanges and the elements are arranged radially to one another, and the two elements may be interchanged with similar elements to vary the torque rating of the couplings to satisfy operational requirements.

---

The conventional flexible coupling for connecting two axially aligned shafts basically consists of flanges mounted on and secured to the adjacent ends of the aligned shafts and a flexible elastomeric torsional element of arcuate cross-section secured to and interconnecting the two flanges. The normal practice in adapting this type of coupling to installations of various torque requirements, is essentially to change the size of the coupling by increasing the size and torque rating of the torsional element. This practice with respect to the installations of high torque requirements frequently results in the use of a large element and shaft flanges which not only may have a relatively low speed rating but are heavy and bulky and difficult to install and properly service. Further, in order to satisfy requirements of all of the various sizes throughout the full range of installations, a relatively large and expensive inventory of coupling parts has had to be maintained, particularly with respect to the torsional elements, if all sizes of elements for optimum performance were to be readily available. It is therefore one of the principal objects of the invention to provide a compound coupling in which a combination of torsional elements is used to interconnect the shaft flanges and to transmit in parallel relation the torsional forces from one shaft to the other, and which is compact in size and capable of withstanding operational conditions for extended periods while maintaining optimum performance.

Another object of the invention is to provide a coupling having a plurality of flexible elements interconnecting the shaft flanges, which uses various combinations of interchangeable elements to give an effective graduated range of ratings suitable for all normal installations of couplings of the present type, and which can cover the range without any substantial variation in overall diameter of the flexible elements.

Still another object of the invention is to provide a shaft coupling of the aforesaid type which will give extended high performance life with little or no service or repairs, and which can easily be installed and can thereafter readily be serviced and the elements interchanged or replaced without removing or disconnecting the flanges from the shaft or without shifting or disassembling the equipment on which the coupling is mounted.

Further objects and advantages of the invention will become apparent from the following description and accompanying drawings, wherein:

FIG. 1 is an end elevational view of a shaft coupling embodying the present invention;

FIG. 3 is a fragmentary cross-sectional view similar to the view of FIG. 2 showing a modified form of the present invention.

Figure 2:
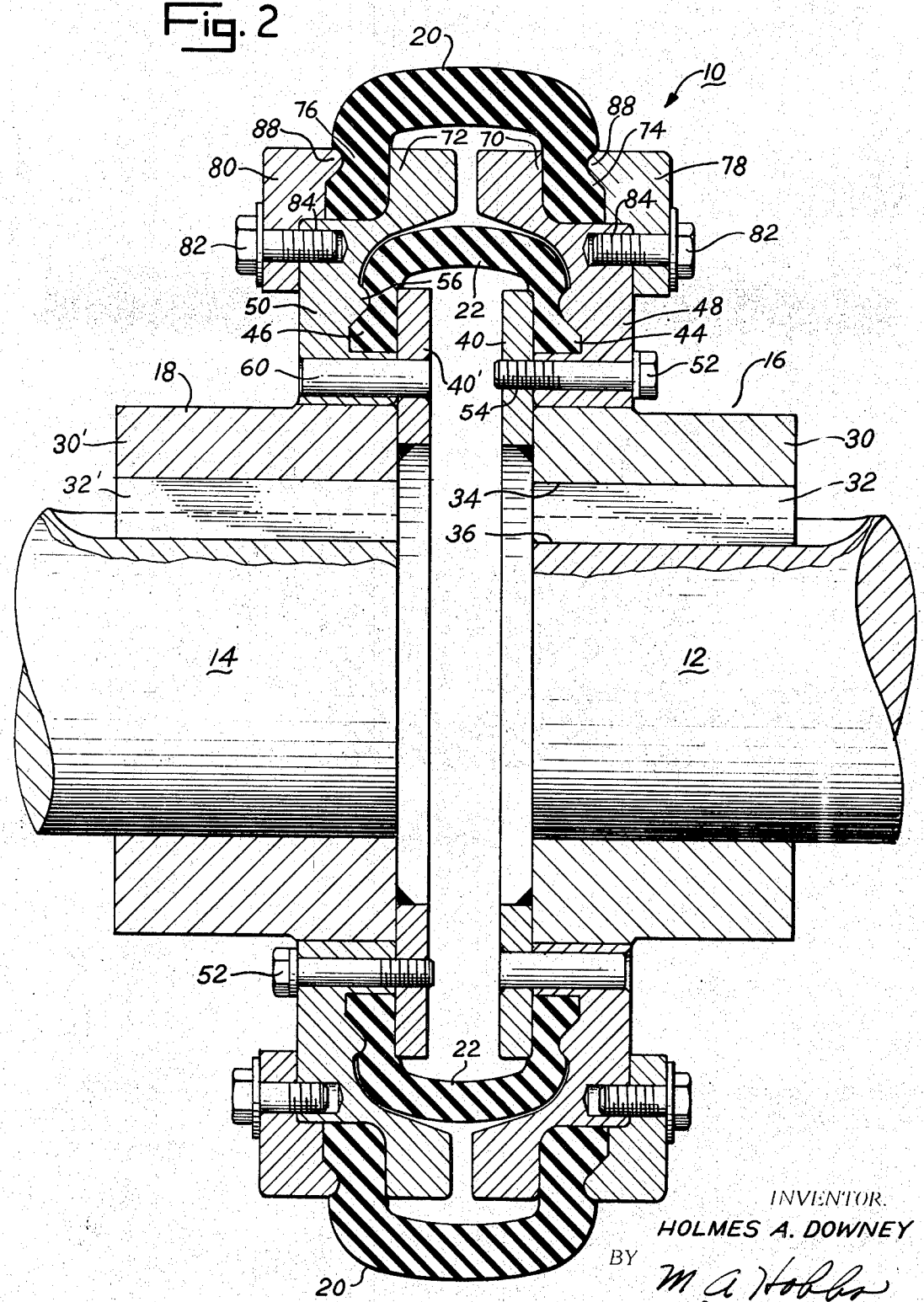
FIG. 2 is an enlarged cross-sectional view of the coupling shown in FIG. 1, the section being taken on line 2—2 of FIG. 1.

Referring more specifically to the drawings, numeral 10 designates generally the present coupling mounted on shafts 12 and 14 arranged in end-to-end position in alignment with one another, one of the said shafts being a drive shaft and the other a driven shaft for transmitting power from a source, such as a motor, to the driven equipment. The present coupling may be used with various types of shafts and with various kinds of equipment, and the coupling may be modified to adapt it to a particular installation. For the purpose of the present description, the drive shaft has been given numeral 12 and the driven shaft numeral 14.

The coupling consists basically of flanges 16 and 18 mounted on the two shafts 12 and 14, respectively, and an outer torsional element 20 and an inner torsional element 22, interconnecting the two flanges 16 and 18 to transmit the torsional forces from shaft 12 to shaft 14. The two flanges 16 and 18 are essentially the same in construction and operation, consisting of a hub 30 connected thereto by a key 32 seated in slots 34 and 36 of hub 30 and shaft 12, respectively. Since the construction of the two flanges is the same, like numerals will be used to identify like parts, with a prime being used in connection with flange 18. Various types of means may be used to secure the hubs of the two flanges to the respective shafts, the key and keyways shown in the drawings being merely for the purpose of illustrating one satisfactory means. Secured to and formed integrally with hub portion 30 of the flanges is a radially extending member 40 joined to hub 30 by welding or other suitable securing means. The radially extending portion 40 is rigidly connected to the hub and forms a rigid member for supporting the two torsional elements 20 and 22. While the two radial portions 40 and 40' are shown as separate members welded rigidly to the inner ends of the two hubs, they may be made as an integral part of the hub to form a continuous structure.

The inner torsional element 22 is arcuate in cross-section and has inwardly extending side walls 44 and 46 disposed on opposite sides of annular portions 40 and 40', the two annular portions extending inwardly along the inner side of the sidewalls which, in the normal operation of the coupling, are seated firmly on the two annular portions. The torsional element 22 is held firmly in place against the two annular portions 40 and 40' by clamping rings 48 and 50 secured to annular portions 40 and 40', respectively, by a plurality of bolts 52 extending through the inner part of the annular clamping rings and threadly received in holes 54 in the respective annular portion. An annular protrusion 56 on the inner surface of the two clamping rings engages the side walls and compresses them sufficiently to retain them firmly in place along the internal surface of the two annular portions. Locating and shear pins 60 are spaced around annular portions 40 and 40' and extend through holes in clamping rings 48 and 50, two pins being rigidly secured to the annular portion and forming, in effect, abutments to resist the torque transmitted between the two shafts. The pins assist in preventing excess forces from being applied to bolts 52, which are spaced alternately with pins 60 around the inner edge of clamping rings 48 and 50, as illustrated in FIG. 1. When bolts 52 have been tightened in place, the torsion element 22 operatively interconnects the two flanges 16 and 18 for transmitting the driving force between shafts 12 and 14.

Clamping rings 48 and 50 have radial shoulders 70 and 72 facing axially outwardly for receiving torsional element 20, the torsional element having radially inwardly extending side walls 74 and 76 seating on the two shoulders and joined integrally with the body portion of the element to interconnect the two rings 48 and 50. The side walls of the torsional element 20 are clamped firmly against the two shoulders by annular clamping rings 78 and 80 seated on and removably secured to clamping rings 48 and 50, respectively. The two rings 78 and 80 are secured to the inner rings 48 and 50 by a plurality of bolts 82 extending through holes in the two rings and into threaded openings 84 in clamping rings 48 and 50.

The two torsional elements are essentially the same in construction, each consisting of fabric reinforced elastomeric body and side walls joined integrally to the body of the element. The fabric extends continuously from one side wall to the other and to a point near the inner edge of the two side walls. The rings 78 and 80 are provided with inwardly extending ribs 88 which press on the side walls of the element to hold them firmly in place against shoulders 70 and 72 with the fabric of the element preferably extending to a point inwardly from the two ribs. The elements are split axially to permit them to be easily assembled around the periphery of the flanges without moving the shafts from their normal operating position. The torque is transmitted from shaft 12 through hub 30, annular portion 40, clamping ring 48, elements 20 and 22, clamping ring 50 and hub 30' to shaft 14. The two elements 20 and 22 are operationally arranged in parallel and one element augments the operation of the other element. It is seen from the foregoing that various combinations of elements 20 and 22 may be used to obtain the desired coupling rating. For example, the rating of element 20 may be increased while the rating of element 22 may remain the same, or the rating of element 22 may be changed while maintaining the rating of element 20 the same. Thus it is possible to obtain a wide variety of coupling ratings without substantially increasing the overall size of the coupling and without maintaining a substantial inventory of the remaining coupling parts. When using the multiple flexible element coupling shown in FIGS. 1 and 2, the installation is made by securing flanges 30 and 30' to shafts 12 and 14, and thereafter assembling the inner and outer elements 22 and 20 by first clamping element 22 in place with clamping rings 48 and 50 and thereafter clamping element 20 in place by clamping rings 78 and 80.

In the operation of coupling 10 when installed in the foregoing manner, rotation of drive shaft 12 transmits the torsional forces from the shaft through hub 30 and through clamping rings 48 and 78 to the two torsional elements, which in turn transmit the force to clamping rings 80 and 50 and to hub 30', which in turn drives shaft 14. In the event there is a failure of either of the two elements, or if a different torsional rating is desired for the couplings, the clamping rings 78 and 80 are removed, permitting the element 20 to be removed without shifting flanges 16 or 18, since this element, like element 22 is split axially to permit it to be placed over and removed from the coupling flanges, the axial slit being illustrated at number 90 in FIG. 1. After clamping rings 78 and 80 have been removed, clamping rings 48 and 50 may thereafter be removed in a like manner to replace element 22. It is seen that with this multiple element construction, the overall diameter of the coupling can be maintained within relatively small limits throughout the entire operational range, thus providing a compact installation which can readily adapt to shaft misalignment and yet provide optimum performance under all normal operating conditions.

The embodiment of the invention as illustrated in FIG. 3 is, in effect, a partial reversal of parts of the flange portion supporting the element. The coupling consists of flanges 100 and 102 mounted on shafts corresponding to shafts 12 and 14 and outer torsional element 104 and inner torsional element 106 interconnecting the flanges and held in place by clamping rings. Flange 100 contains a radially extending portion 110 on which an element securing ring 112 is supported by a plurality of bolts 114. The clamping ring for element 104 consists of annular member 116 mounted on member 112 and secured thereto by a plurality of bolts 118 extending through an inwardly projecting flange 120 and into threaded holes in clamping ring 116. The clamping ring 116 forms an element securing member for element 106 which is clamped against the inner face of ring 116 by a ring 122 secured to ring 116 by a plurality of bolts extending through ring 116 and through threaded holes 124 in clamping ring 122.

The torsional forces of shaft 12 are transmitted through flange 100 and through radial portion 110, element securing member 112, and torsional element 104 to the corresponding elements on shaft 14. The torsional forces are also distributed through element 106 by clamping ring 112 and clamping ring 116 and to element 106 which transmits the forces therefrom to corresponding elements of flange 102 on shaft 14. The operation of the multiple flexible coupling of the embodiment shown in FIG. 3 is essentially the same as the operation of the coupling shown in FIGS. 1 and 2, and the advantages of using the multiple torsional element, including the effective broad rating range of small increments, are also present in the embodiment of FIG. 3. Either one of the two elements may be replaced to obtain the desired operational characteristics, and the coupling is maintained as a relatively compact structure throughout the entire range of element ratings.

While two torsional elements have been shown and described herein, it is possible to utilize in the same basic structure three or more elements under various conditions assembled in generally the same manner as either of the embodiments of FIGS. 1 and 3. This would provide a greater number of increments throughout the range without substantially increasing the overall size of the coupling. Various changes and modifications may be made without departing from the scope of the invention.

I claim:

1. A multiple element coupling for connecting two rotatable shafts in end-to-end relation, said coupling comprising flanges for mounting on the shafts in spaced axial relation to one another, an outer flexible torsional element interconnecting said flanges, a pair of clamping means releasably connecting said outer element to both of said flanges, an inner flexible torsional element interconnecting said flanges in parallel operational relation to said outer element, and a pair of clamping means releasably connecting said inner element to both of said flanges, whereby various rating combinations of flexible elements can be selected by substituting one or both of said elements in the coupling.

2. A multiple element coupling as defined in claim 1 in which said outer element is generally arcuate in cross-sectional shape and has inwardly extending side walls.

3. A multiple element coupling as defined in claim 2 in which said inner element is generally arcuate in cross-sectional shape and has inwardly extending side walls.

4. A multiple element coupling as defined in claim 3 in which said outer torsional element is secured to said clamping rings and a second pair of clamping rings secures said outer element to said first mentioned clamping rings.

5. A multiple element coupling as defined in claim 3 in which said torsional elements are of arcuate cross-sectional shape and are constructed of reinforced elastomeric material.

6. A multiple element coupling as defined in claim 1 in which said inner element is generally arcuate in cross-sectional shape and has inwardly extending side walls.

7. A multiple element coupling as defined in claim 6 in which a pair of clamping rings secured to said flanges retains said inner element in operative position interconnecting said flanges.

8. A multiple element coupling as defined in claim 1 in which a pair of clamping rings is secured to said inner element in operative position interconnecting said flanges.

9. A multiple element coupling as defined in claim 8 in which said outer torsional element is secured to said clamping rings and a second pair of clamping rings secures said outer element to said first mentioned clamping rings.

10. A multiple element coupling as defined in claim 1 in which means connects said inner element to said flanges and means connects said outer element to said last mentioned means.

11. A multiple element coupling as defined in claim 1 in which means connects said outer element to said flanges and means connects said inner element to said last mentioned means.

12. A multiple element coupling as defined in claim 1 in which said flanges include a radially extending annular portion and in which a means connects said element to said annular portion, and in which said inner element is connected to said last mentioned means.

References Cited

UNITED STATES PATENTS

| | | | |
|---|---|---|---|
| 2,921,449 | 1/1960 | Jackel | 64—13 |
| 3,283,535 | 11/1966 | Grundtner | 64—11 |

FOREIGN PATENTS

| | | | |
|---|---|---|---|
| 508,069 | 6/1939 | Great Britain | 64—11 |
| 972,890 | 10/1964 | Great Britain | 64—11 |
| 1,130,367 | 9/1956 | France | 64—13 |

JAMES A. WONG, Primary Examiner

U.S. Cl. X.R.

64—27